(12) United States Patent
Honda

(10) Patent No.: US 12,348,685 B2
(45) Date of Patent: Jul. 1, 2025

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Takuya Honda, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 336 days.

(21) Appl. No.: 17/894,150

(22) Filed: Aug. 23, 2022

(65) Prior Publication Data

US 2023/0291846 A1  Sep. 14, 2023

(30) Foreign Application Priority Data

Mar. 10, 2022 (JP) ................ 2022-037246

(51) Int. Cl.
*G06K 15/00* (2006.01)
*H04N 1/00* (2006.01)

(52) U.S. Cl.
CPC ..... *H04N 1/00082* (2013.01); *H04N 1/00042* (2013.01); *H04N 2201/0094* (2013.01)

(58) Field of Classification Search
CPC .......... H04N 1/00082; H04N 1/00042; H04N 2201/0094
USPC ....................................... 358/1.15
See application file for complete search history.

(56) References Cited

U.S. PATENT DOCUMENTS

| 2002/0015180 | A1* | 2/2002 | Tominaga | G06F 3/121 |
| | | | | 358/1.15 |
| 2003/0030842 | A1* | 2/2003 | Suyehira | G03G 15/5079 |
| | | | | 358/1.15 |
| 2011/0029346 | A1* | 2/2011 | Kong | G06F 3/1232 |
| | | | | 705/348 |
| 2017/0289750 | A1* | 10/2017 | Haapanen | G08B 13/2462 |
| 2023/0308584 | A1* | 9/2023 | Kudo | G06F 3/1222 |

FOREIGN PATENT DOCUMENTS

JP      2004289642      10/2004

OTHER PUBLICATIONS

IP.com search history (Year: 2025).*
ProQuest search history (Year: 2025).*

* cited by examiner

*Primary Examiner* — Moustapha Diaby
(74) *Attorney, Agent, or Firm* — JCIPRNET

(57) ABSTRACT

An information processing apparatus includes a processor configured to: in a state where plural image forming devices are arranged to be distributed into a first place and a second place, the first place in which a specific user exclusively uses the image forming device, and the second place in which plural users share and use the image forming device, in a case where a usage status of a user changes or any of the plural image forming devices arranged changes, propose re-arrangement of the plural image forming devices arranged with reference to a usage history of each function by each user in the plural image forming devices.

7 Claims, 14 Drawing Sheets

FIG. 4

EXAMPLE OF USER MANAGEMENT TABLE

| USER NAME | TELEWORKING | HOME-INSTALLED DEVICE |
|---|---|---|
| USER A | YES | IMAGE FORMING DEVICE 41 |
| USER B | NO | NONE |
| USER C | NO | NONE |
| USER D | YES | IMAGE FORMING DEVICE 42 |

FIG. 6

EXAMPLE OF LIST TABLE
OF HOME-INSTALLED DEVICE USING USER

| USER NAME | TELEWORKING | HOME-INSTALLED DEVICE |
|---|---|---|
| USER A | YES | IMAGE FORMING DEVICE 41 |
| USER D | YES | IMAGE FORMING DEVICE 42 |

FIG. 7

EXAMPLE OF USAGE STATUS TABLE OF USER A

| USAGE ITEM | USAGE STATUS AT HOME | USAGE STATUS IN OFFICE |
|---|---|---|
| NUMBER OF TIMES OF PERFORMING COLOR-COPYING | 3 | 300 |
| NUMBER OF TIMES OF PERFORMING BLACK-AND-WHITE COPYING | 0 | 100 |
| NUMBER OF TIMES OF PERFORMING SCANNING | 0 | 200 |
| NUMBER OF TIMES OF PERFORMING PRINTING | 0 | 50 |
| POWER CONSUMPTION | 2W | – |
| NUMBER OF TIMES OF TURNING POWER ON | 1 | – |
| NUMBER OF TIMES OF AUTHENTICATIONS | 1 | 50 |

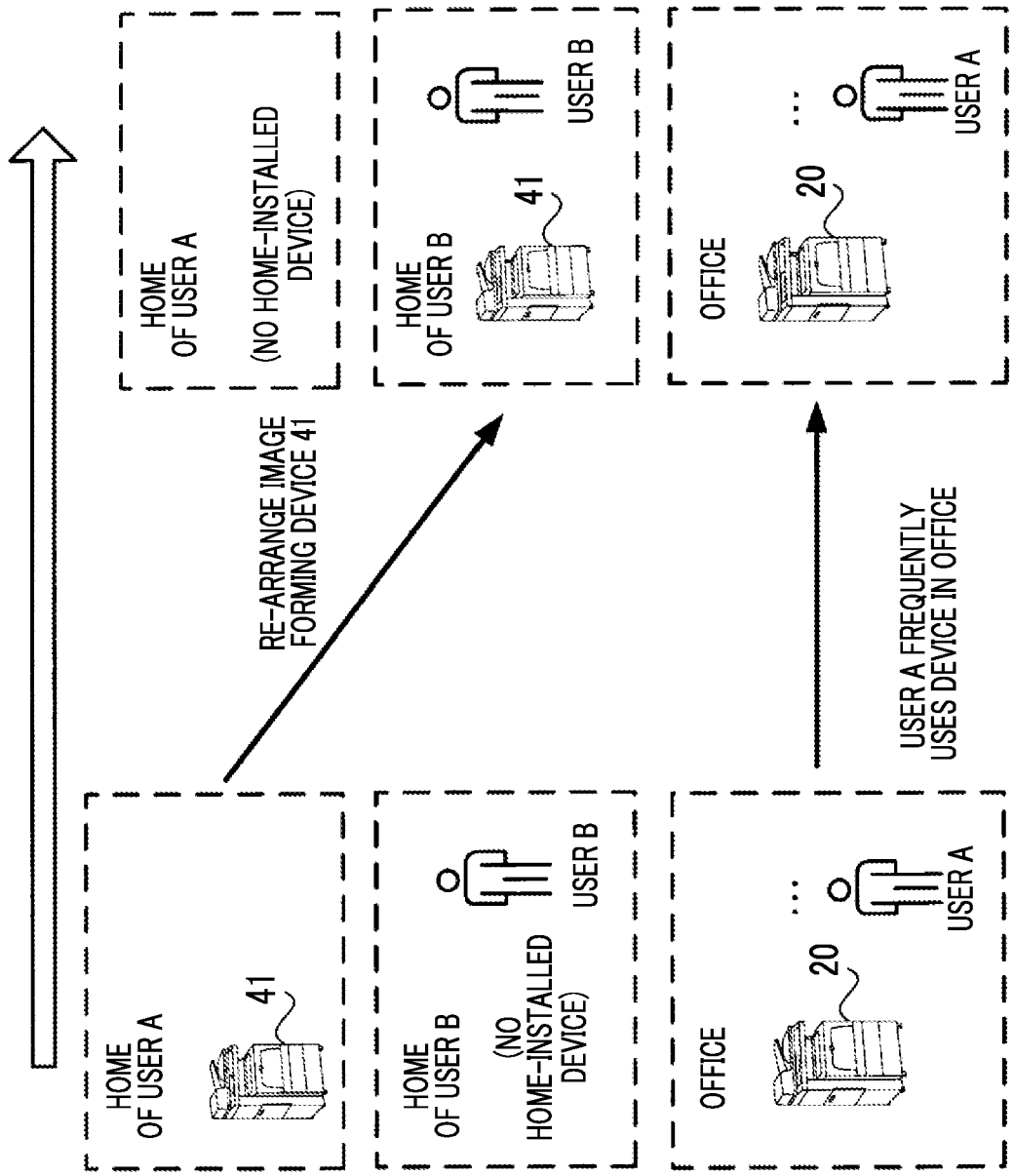

FIG. 9

EXAMPLE OF USER MANAGEMENT TABLE

| USER NAME | TELEWORKING | HOME-INSTALLED DEVICE | FAILURE LOCATION |
|---|---|---|---|
| USER A | YES | IMAGE FORMING DEVICE 41 | NONE |
| USER B | NO | IMAGE FORMING DEVICE 43 | NONE |
| USER C | NO | NONE | - |
| USER D | YES | IMAGE FORMING DEVICE 42 | FAX |

⇩ CHANGE

| USER NAME | TELEWORKING | HOME-INSTALLED DEVICE | FAILURE LOCATION |
|---|---|---|---|
| USER A | YES | IMAGE FORMING DEVICE 41 | NONE |
| USER B | NO | IMAGE FORMING DEVICE 43 | SCANNER |
| USER C | NO | NONE | - |
| USER D | YES | IMAGE FORMING DEVICE 42 | FAX |

FIG. 10

EXAMPLE OF USAGE STATUS STABLE FOR HOME-INSTALLED DEVICES OF ALL USERS

| USAGE ITEM | USER A | USER B | USER D |
|---|---|---|---|
| NUMBER OF TIMES OF PERFORMING COLOR-COPYING | 300 | 0 | 20 |
| NUMBER OF TIMES OF PERFORMING BLACK-AND-WHITE COPYING | 20 | 10 | 50 |
| NUMBER OF TIMES OF PERFORMING SCANNING | 0 | 200 | 100 |
| NUMBER OF TIMES OF PERFORMING PRINTING | 120 | 150 | 30 |
| NUMBER OF TIMES OF PERFORMING TRANSMISSION AND RECEPTION BY FAX | 0 | 0 | 0 |

FIG. 13

EXAMPLE OF LIST TABLE
OF HOME-INSTALLED DEVICE USING USER

| USER NAME | TELEWORKING | HOME-INSTALLED DEVICE | FAILURE LOCATION |
|---|---|---|---|
| USER A | YES | IMAGE FORMING DEVICE 41 | NONE |
| USER D | YES | IMAGE FORMING DEVICE 42 | FAX |

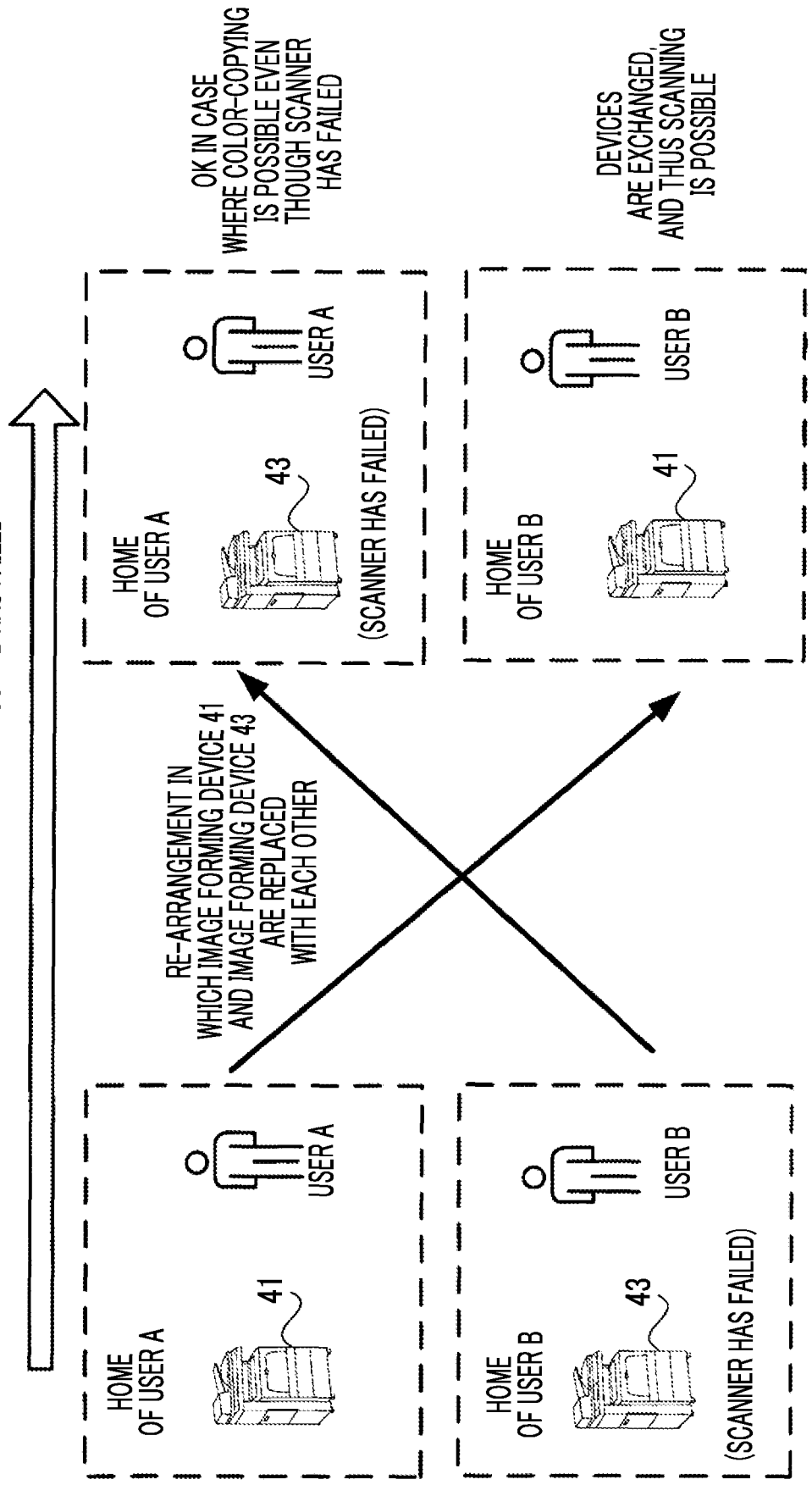

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-037246 filed Mar. 10, 2022.

BACKGROUND

(i) Technical Field

The present invention relates to an information processing apparatus, a non-transitory computer readable medium storing a program, and an information processing method.

(ii) Related Art

JP2004-289642A discloses an optimum arrangement analysis apparatus capable of analyzing an optimum installation place of a multifunction device in an office or the like by calculating an optimum arrangement degree of the multifunction device based on the usage history logs and position information of the multifunction device, position information of a client, and an optimum arrangement coefficient.

SUMMARY

Aspects of non-limiting embodiments of the present disclosure relate to an information processing apparatus, a non-transitory computer readable medium storing a program, and an information processing method capable of proposing re-arrangement in response to a change in a usage status of a user or a change in an image forming device in a state where a plurality of image forming devices are arranged to be distributed into a place in which a specific user exclusively uses the image forming device and a place in which a plurality of users share and use the image forming device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus includes a processor configured to: in a state where a plurality of image forming devices are arranged to be distributed into a first place and a second place, the first place in which a specific user exclusively uses the image forming device, and the second place in which a plurality of users share and use the image forming device, in a case where a usage status of a user changes or any of the plurality of image forming devices arranged changes, propose re-arrangement of the plurality of image forming devices arranged with reference to a usage history of each function by each user in the plurality of image forming devices.

BRIEF DESCRIPTION OF THE DRAWINGS

Exemplary embodiment(s) of the present invention will be described in detail based on the following figures, wherein:

FIG. 4 is a diagram illustrating an example of a user management table stored in a data storage unit;

FIG. 6 is a diagram illustrating an example of a list table of a home-installed device using user extracted from the user management table;

FIG. 7 is a diagram illustrating an example of a usage status table for comparing a usage status of a user A at home and a usage status in an office;

FIG. 8 is a diagram illustrating re-arrangement in which an image forming device 41 arranged at the home of the user A is moved to home of a user B who has started teleworking;

FIG. 9 is a diagram illustrating an example of the user management table including information on a failure location of an image forming device;

FIG. 10 is a diagram illustrating an example of the usage status table showing the usage status of home-installed devices of all users in which the image forming device is arranged at home;

FIG. 13 is a diagram illustrating an example of the list table of the home-installed device using user, which is created by extracting a user who are using a home-installed device from users other than the user B; and FIG. 14 is a diagram illustrating re-arrangement in which the image forming device 41 arranged at the home of the user A and an image forming device 43 arranged at the home of the user B are replaced with each other.

DETAILED DESCRIPTION

Next, an exemplary embodiment of the present disclosure will be described in detail with reference to the drawings.

Figure 1:
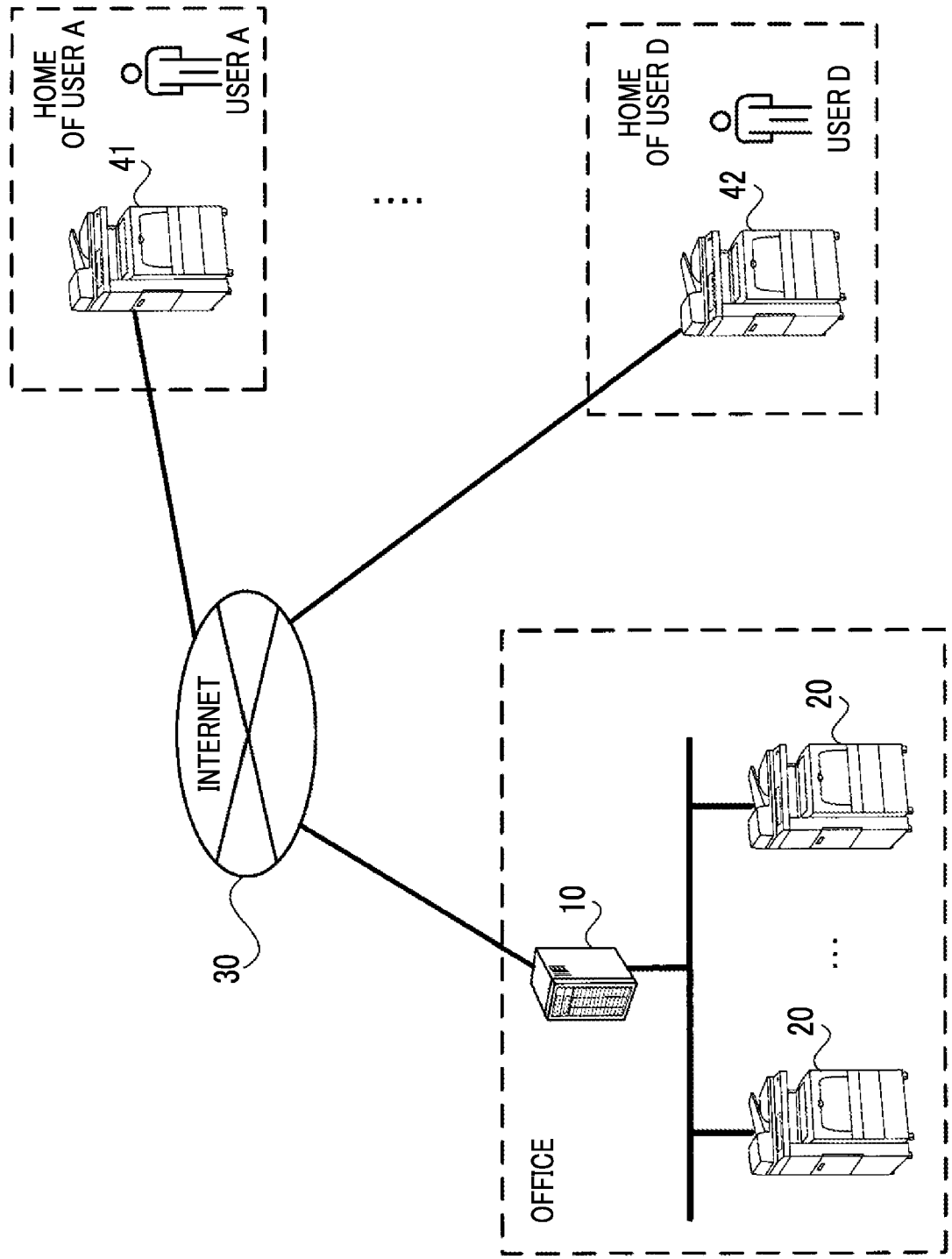
FIG. 1 is a diagram illustrating a system configuration of an image forming system according to an exemplary embodiment of the present disclosure.

FIG. 1 is a diagram illustrating a system configuration of an image forming system according to an exemplary embodiment of the present disclosure.

As illustrated in FIG. 1, the image forming system in the exemplary embodiment of the present disclosure is configured such that a plurality of image forming devices are arranged to be distributed not only in an office of a certain company but also at homes and the like of individual users.

Specifically, in FIG. 1, a plurality of image forming devices 20 are arranged in the office, an image forming device 41 is arranged at the home of a user A, and an image forming device 42 is arranged at the home of a user D.

A management server 10 which is an information processing apparatus that manages the image forming devices 20, the image forming devices 41 and 42, and the like is provided in the office. The management server 10 is connected to the image forming device 20 in the office by an in-house LAN or the like, and is connected to the image forming device 41, 42, or the like arranged at the home of the user through the Internet 30.

Here, in recent years, due to the spread of teleworking, an image forming device may be arranged and used in a private house. In such a case, the image forming device 20 arranged in the office is shared and used by a plurality of users, but the image forming devices 41 and 42 arranged in the homes of the respective users are exclusively used by the respective users.

In such a state, each user works in a manner of performing teleworking on some days or going to the office on other days. However, in such a work style, there are users who works only in the office without performing teleworking, and there are users who almost performs teleworking without going to the office less. In addition, the number of image forming devices is limited, and it may not be possible to arrange the image forming devices at the homes of all users who perform teleworking. Therefore, the image forming device is appropriately arranged at the home of a user who performs teleworking in accordance with a working status of the user and a usage status of the image forming device so that the work can be performed. The image forming device includes not only a so-called multifunction device having a plurality of functions such as a printing function, a scanning function, a copying function, and a facsimile function, but also a device such as a printing device having only a printing function.

Even in a case where the image forming device is appropriately arranged at the beginning, due to changes in working style, a user who has worked only in the office may start teleworking, or conversely, a user who has performed teleworking may stop teleworking and work only in the office. In addition, some functions of the device arranged at the home of the user may have a problem and become unusable. In a case where such a change in the usage status of the user or a change in the state of the image forming device occurs, maintaining the arrangement of the image forming device hinders working.

Therefore, in the management server 10 in the present exemplary embodiment, there is proposed re-arrangement in response to a change in the usage status of the user or a change in the state of the image forming device in a state where a plurality of image forming devices are arranged to be distributed into a place such as the home of an individual in which a specific user exclusively uses the image forming device and a place such as an office in which a plurality of users share and use the image forming device. Here, the re-arrangement of the image forming device means the movement of the image forming device arranged in the home of a certain user to the home of another user, replacement between the image forming device installed at the home of a certain user and the image forming device installed at the home of another user, withdrawal of the image forming device arranged at the home of a certain user, and the like, as described above.

Figure 2:
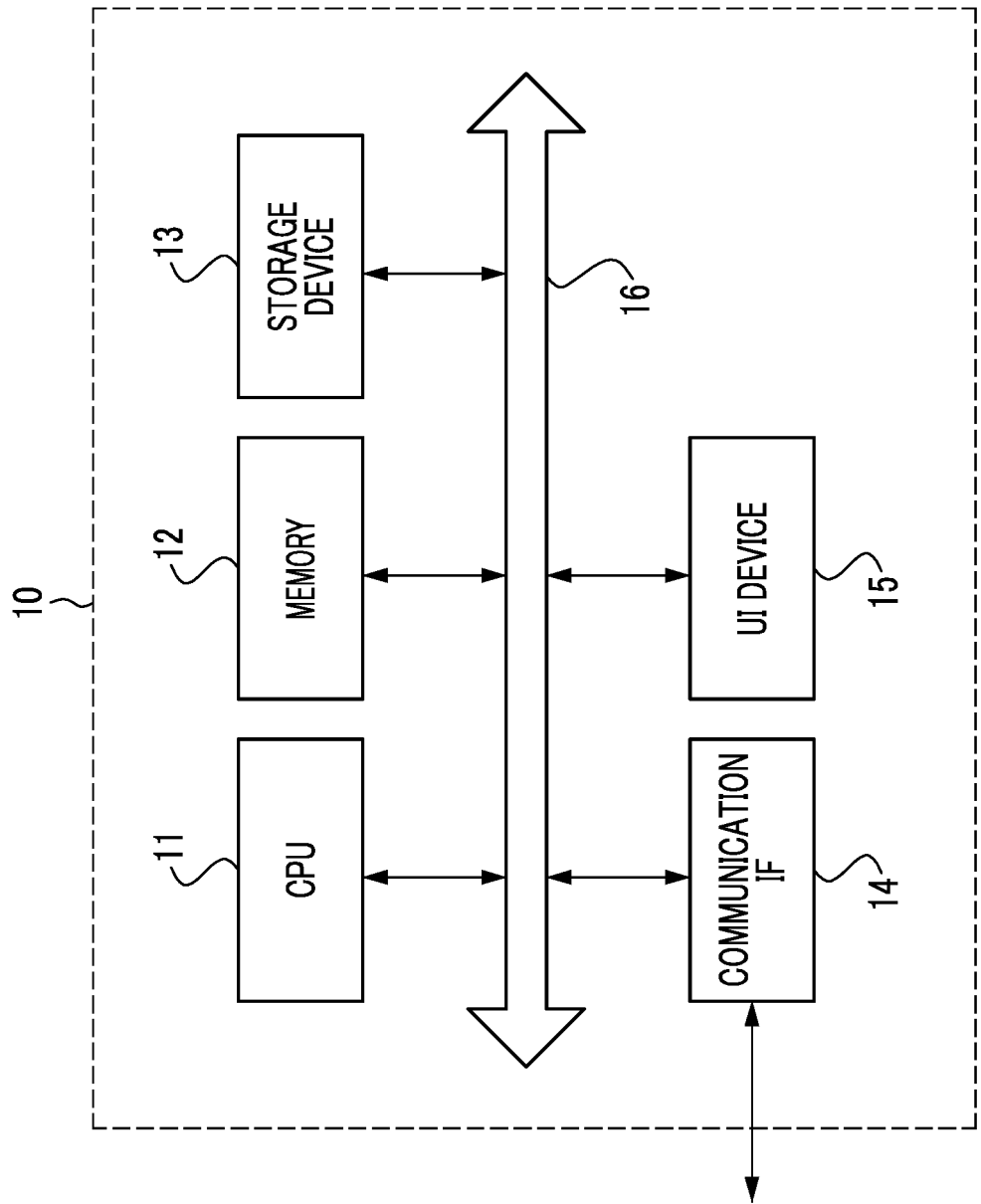
FIG. 2 is a block diagram illustrating a hardware configuration of a management server 10 in the exemplary embodiment of the present disclosure.

Next, FIG. 2 illustrates the hardware configuration of the management server 10 in the image forming system of the present exemplary embodiment.

The management server 10 is configured by, for example, an information processing apparatus such as a personal computer. As illustrated in FIG. 2, the management server 10 includes a CPU 11, a memory 12, a storage device 13 such as a hard disk drive, a communication interface (abbreviated as an IF) 14 that transmits and receives data to and from an external device or the like through the Internet 30 or another network, and a user interface (abbreviated as a UI) device 15 including a touch panel or a liquid crystal display, and a keyboard. The components are connected to each other through a control bus 16.

The CPU 11 is a processor that controls the operation of the management server 10 by executing a predetermined process based on a control program stored in the memory 12 or the storage device 13. In the present exemplary embodiment, description will be made on the assumption that the CPU 11 reads and executes the control program stored in the memory 12 or the storage device 13, but the present disclosure is not limited to this. The control program may be provided in a form of being recorded on a computer readable recording medium. For example, the program may be provided in a form of being recorded on an optical disk such as a compact disc (CD)-ROM and a digital versatile disc (DVD)-ROM, or in a form of being recorded on a semiconductor memory such as a universal serial bus (USB) memory and a memory card. The control program may be acquired from an external device through a communication line connected to the communication interface 14.

Figure 3:
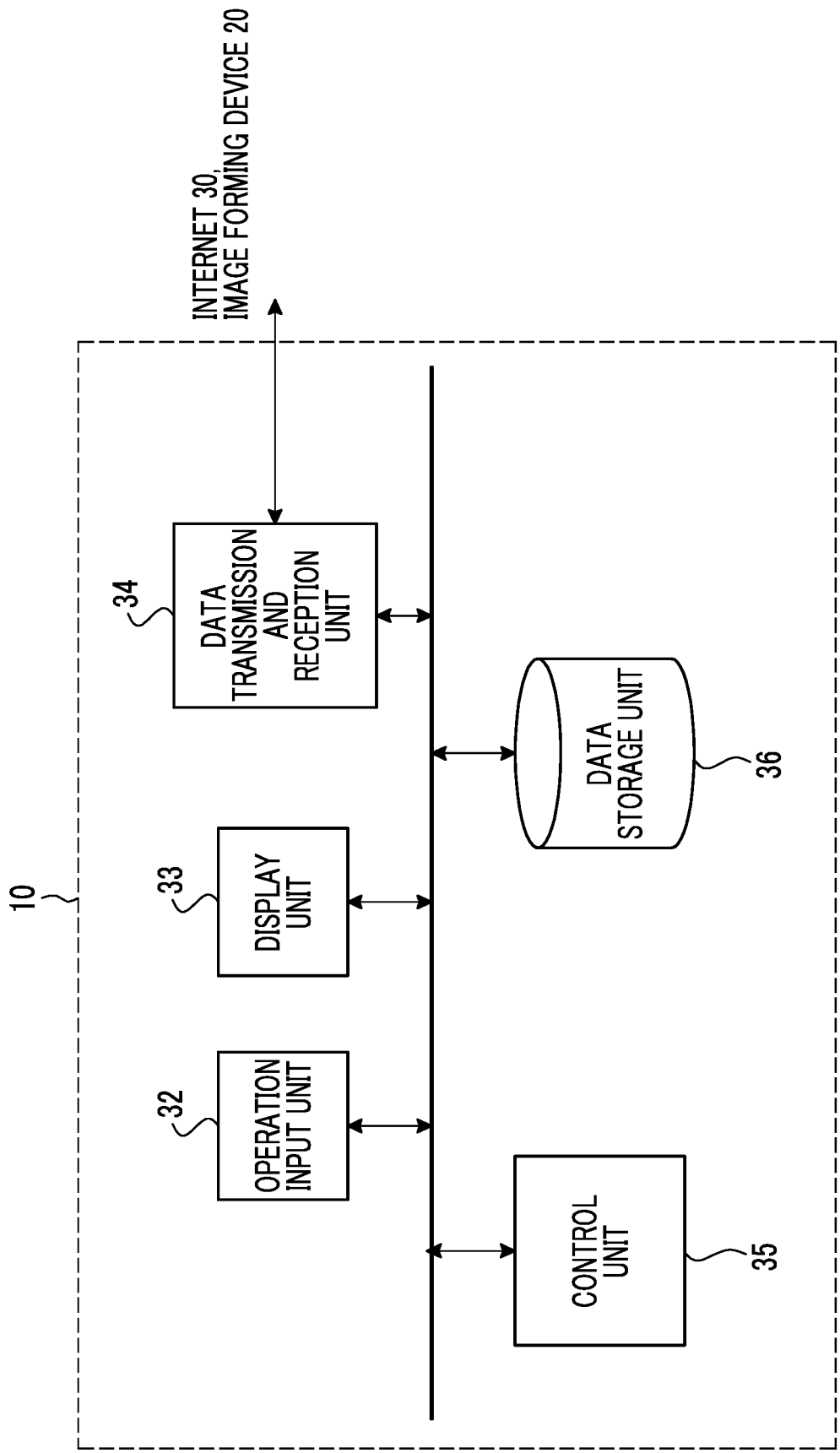
FIG. 3 is a block diagram illustrating a functional configuration of the management server 10 in the exemplary embodiment of the present disclosure.

FIG. 3 is a block diagram illustrating the functional configuration of the management server 10 realized by executing the above control program.

As illustrated in FIG. 3, the management server 10 in the present exemplary embodiment includes an operation input unit 32, a display unit 33, a data transmission and reception unit 34, a control unit 35, and a data storage unit 36.

The data transmission and reception unit 34 transmits and receives data to and from the external device such as the image forming device 41 or 42 arranged at the home of the user through the Internet 30, and transmits and receives data to and from the image forming device 20 arranged in the office through the in-house LAN. The display unit 33 is controlled by the control unit 35 and displays various types of information to the user. The operation input unit 32 inputs information on various operations performed by the user.

The data storage unit 36 stores various types of data based on the control by the control unit 35, and also acquires and stores the usage status of each user in the image forming device 20 and the usage status of the image forming device 41 or 42, or the like arranged at the home of each user. Here, the usage status of the image forming device specifically means the usage history of each user for each function such as printing, scanning, and copying. Further, the data storage unit 36 stores a user management table as illustrated in FIG. 4. As illustrated in FIG. 4, information on whether or not each user performs teleworking and information on a home-installed device which is a device arranged at home are stored in the user management table, for each user. According to the user management table illustrated in FIG. 4, for example, it can be understood that the user A performs teleworking and the image forming device 41 is arranged at the home of the user A.

The control unit 35 proposes re-arrangement of the image forming devices 20, 41, and 42, and the like to the user by using the information stored in the user management table and the information on the usage status acquired from the image forming device 20 and the image forming devices 41 and 42 described above.

Specifically, in a case where, in a state where the plurality of image forming devices 20, 41, and 42 are arranged to be distributed into the office and the home of the user, the usage status of the user changes or a state of any of the arranged image forming devices 20, 41, and 42 changes, the control unit 35 proposes re-arrangement of the plurality of arranged image forming devices 20, 41, and 42 with reference to the usage history of each user for each function in the image forming devices 20, 41, and 42.

For example, in a case where a certain user starts teleworking of performing work at home, the control unit 35 extracts an image forming device having a usage frequency that is equal to or less than a value set in advance among the image forming devices used at homes by other users. Then, the control unit 35 proposes re-arrangement of the extracted image forming device to home at which the user who has started teleworking performs work.

More specifically, with reference to a value of the number of output sheets at home and a value in the office, the number of output sheets being the sum of the number of printed sheets and the number of copies, the control unit 35 extracts the image forming device of the user in which a ratio of the value at the home to the value in the office is equal to or less than a ratio set in advance, as the image forming device having the usage frequency that is equal to or less than the value set in advance. Then, the control unit 35 proposes re-arrangement of the extracted image forming device to the home at which the user who has started teleworking performs work.

Further, in a case where a specific function in any image forming device arranged in the home of the user has failed, and the usage frequency of the failed specific function is higher than a value set in advance, the control unit 35 proposes re-arrangement in which the failed image forming device and another image forming device are replaced with each other.

Specifically, in a case where the scanning function of the image forming device arranged at the home of a user who frequently uses the scanning function has failed, a problem occurs in performing work by the user. Therefore, the management server 10 proposes re-arrangement in which the image forming device in which the scanning function has failed and another image forming device are replaced with each other.

For example, the control unit 35 extracts, from a plurality of image forming devices, an image forming device in which the usage frequency of the failed specific function is equal to or less than a value set in advance. In a case where the function having the usage frequency that is higher than the value set in advance in the image forming device is provided in the failed image forming device, and the function having the usage frequency that is higher than the value set in advance in the failed image forming device is provided in the extracted image forming device, the control unit 35 proposes re-arrangement in which the failed image forming device and the extracted image forming device are replaced with each other.

That is, in a case where the scanning function of the image forming device arranged at the home of the user who frequently uses the scanning function has failed, and in a case where the image forming device arranged at the home of a user who does not use the scanning function includes the scanning function and the function that is frequently used by the user who does not use the scanning function is provided in the image forming device in which the scanning function has failed, the control unit 35 proposes re-arrangement in which such image forming devices are replaced with each other.

Next, the operation of the management server 10 in the present exemplary embodiment will be described in detail with reference to the drawings.

Case where Certain User Starts Teleworking

Figure 5:
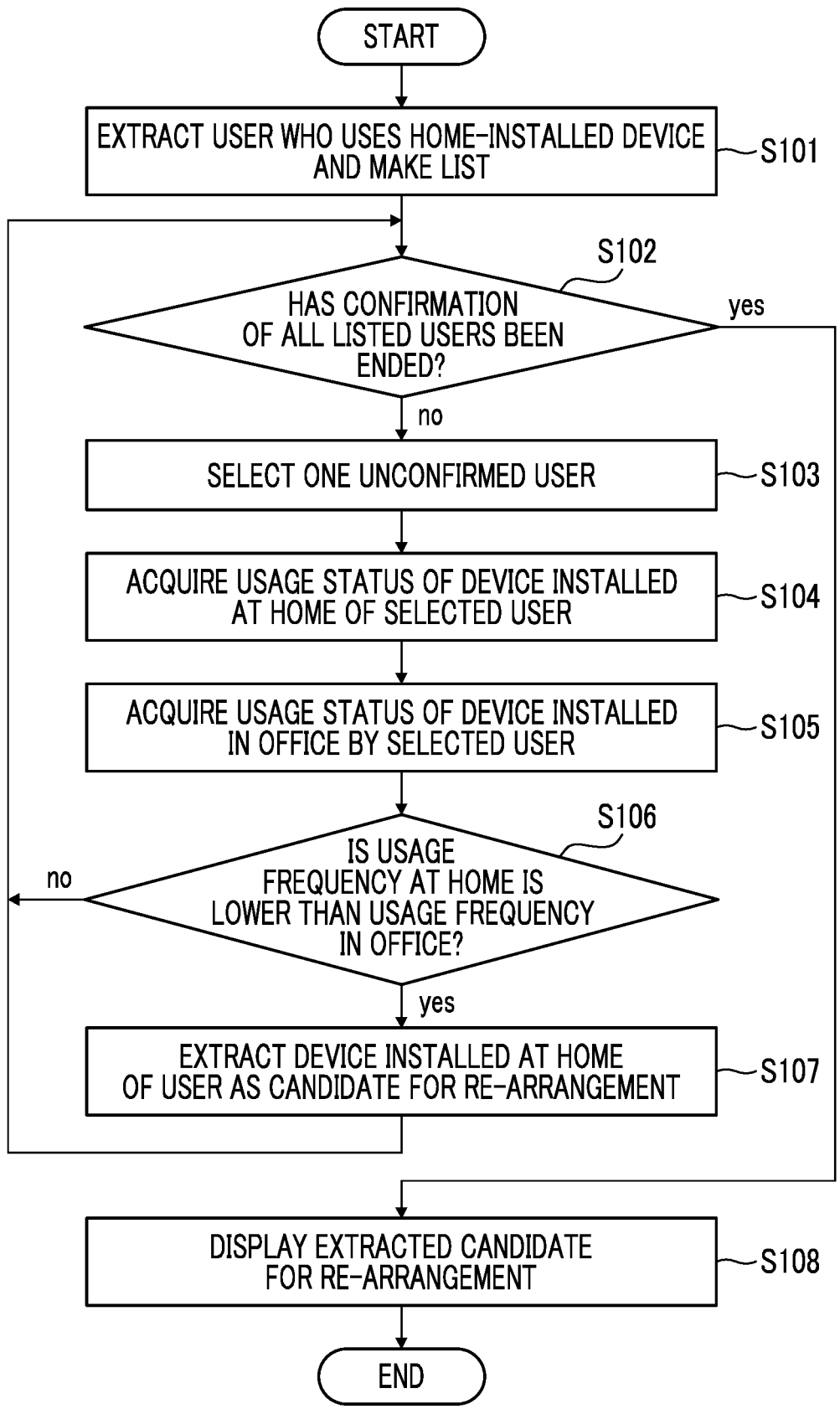
FIG. 5 is a flowchart illustrating an operation of the management server 10 in the exemplary embodiment of the present disclosure in a case where a certain user starts teleworking.

First, the operation of the management server 10 in the exemplary embodiment of the present disclosure in a case where a certain user starts teleworking will be described with reference to the flowchart in FIG. 5.

In a case where a certain user starts teleworking, in Step S101, the control unit 35 extracts, from the user management table illustrated in FIG. 4, a user who uses a home-installed device being the image forming device installed at the home of the user. Then, the control unit 35 makes a list of the extracted users. FIG. 6 illustrates an example of a list table of a home-installed device using user extracted in this manner. With reference to FIG. 6, it can be understood that the users A and D are extracted, and the image forming devices 41 and 42 are arranged at the home, respectively.

Then, in Step S102, the control unit 35 determines whether or not the confirmation of all the listed users has been ended. Here, since the confirmation of all the users has not been ended yet, the control unit 35 selects one unconfirmed user in Step S103. Description will be made on the assumption that, for example, the control unit 35 selects the user A from the list table illustrated in FIG. 6.

Then, in Step S104, the control unit 35 acquires the usage status of the image forming device 41, which is a device arranged at the home of the selected user A, from the data storage unit 36. Further, in Step S105, the control unit 35 acquires the usage status of the user A in the image forming device 20 arranged in the office, from the data storage unit 36.

FIG. 7 illustrates an example of a usage status table for comparing the usage status at home of the user A acquired in this manner and the usage status in the office.

Then, in Step S106, the control unit 35 determines whether or not the usage frequency of the image forming device 41 at the home of the selected user A is lower than the usage frequency of the image forming device 20 in the office.

The example of the usage status table illustrated in FIG. 7 shows the number of times of use within a predetermined period, for example, one week or one month, and shows the usage frequency of each function such as "color-copying", "black-and-white copying", or "scanning". The control unit 35 may perform image analysis of the scanned image data or the printed image data to determine the document content of the image data, and store the usage status of each document content in the data storage unit 36.

In Step S106, in a case where the control unit 35 determines the usage frequency of the image forming device, the control unit 35 may perform the determination based on the usage frequency of a specific function of the image forming device, or based on a value obtained by summing up the usage frequencies of a plurality of functions. In the following description, as an example, a case where the control unit 35 determines the usage frequency of the image forming device based on the number of output sheets, which is the sum of the number of printed sheets and the number of copies, will be described.

For example, it is assumed that, in a case where the ratio of the number of output sheets at home to the number of output sheets in the office is equal to or less than 5%, the control unit 35 determines that the usage frequency of the image forming device at the home of the user is lower than the usage frequency of the image forming device in the office.

In a case where the usage status of the user A is a state as illustrated in FIG. 7, the control unit 35 calculates the value of the usage frequency at the home and the usage frequency in the office by, for example, the following calculation expression. Here, the calculation is performed on the assumption that the number of output sheets is the sum of the "number of times of performing color-copying", the "number of times of performing black-and-white copying, and the "number of times of performing printing".

Usage frequency at home/usage frequency in office=
(3+0+0+0)/(300+100+50)≈0.7%

In a case where it is determined in Step S106 that the usage frequency of the image forming device 41 at the home of the user A is lower than the usage frequency of the image forming device 20 in the office, in Step S107, the control unit 35 extracts, as a candidate for re-arrangement, the image forming device 41 arranged at the home of the user A. According to the calculation expression described above, the usage frequency of the image forming device 41 at the home of the user A is about 0.7% of the usage frequency of the image forming device 20 in the office. Thus, the control unit 35 determines that the usage frequency of the image forming device 41 at the home of the user A is low. Therefore, the control unit 35 extracts the image forming device 41 arranged at the home of the user A, as the candidate for re-arrangement. Then, the control unit 35 proceeds to the process of Step S102.

In a case where it is not determined that the usage frequency of the image forming device at the home of the user selected in Step S106 is lower than the usage frequency of the image forming device 20 in the office, the control unit 35 does not extract the image forming device arranged at the home of the selected user as the candidate for re-arrangement and proceeds to the process of Step S102.

In Step S102, the control unit 35 determines whether or not the confirmation of all the users listed in Step S101 has ended. The control unit 35 repeats the processes of Steps S103 to S107 until the confirmation of all the listed users is ended.

In a case where it is determined that the confirmation of all the users listed in Step S102 has ended, in Step S108, the control unit 35 displays a list of image forming devices extracted as the candidates for re-arrangement.

With the determination process as described above, the control unit 35 proposes, for example, re-arrangement in which the image forming device 41 is moved to the home of the user B from the home of the user A, by displaying the re-arrangement on the display unit 33. An administrator user who has received the proposal for the re-arrangement decides to move the image forming device 41 to the home of the user B, and arranges the movement. As a result, as illustrated in FIG. 8, the image forming device 41 is arranged at the home of the user B who has started teleworking. Here, since the user A uses the image forming device 20 almost in the office and hardly uses the image forming device 41 arranged at the home, there is no problem in work. The user B who has started teleworking can print, scan, and the like even at the home by receiving the image forming device 41 from the user A.

In the above description, the usage frequency of the image forming device arranged at the home and the usage frequency of the image forming device in the office are compared based on the number of output sheets. The usage frequency can be determined by using information on other usage histories such as the number of operations, the frequency of cooperation with external software, power consumption, and the number of times of turning power ON.

Further, the control unit 35 proposes re-arrangement not only in a case where a certain user starts teleworking, but also in a case where the arrangement state of the image forming device and the usage status of the user do not match. For example, in a case where an image forming device having a slow printing speed is arranged at the home of a user who performs printing a large amount, and an image forming device having a high printing speed is arranged at the home of a user who hardly uses the printing function, the control unit 35 may propose re-arrangement of replacing the image forming devices with each other.

Case where Some Functions of Image Forming Device Arranged at Home have Failed

Next, the operation of the management server 10 in a case where some functions of the image forming device arranged at the home of a certain user have failed will be described.

In order to propose the re-arrangement of the image forming device in a case where some functions of the image forming device arranged at the home of a certain user has failed, the control unit 35 in the management server 10 manages, as the user management table, information on a failure location of the image forming device arranged at the home of the user.

FIG. 9 illustrates an example of such a user management table. Here, in order to simplify the description, description will be made on the assumption that all users who use the image forming device are only four users A to D. The control unit 35 periodically transmits and receives data to and from the image forming device arranged at the home of the user through the Internet 30, monitors whether or not the function of the image forming device has failed, and updates the user management table.

In the example of the user management table illustrated in FIG. 9, it can be understood that, for the image forming device arranged at the home of the user, not only information on whether or not there is the failure location but also information on which function the failure location has occurred are managed. Then, in the example of the user management table illustrated in FIG. 9, an example of a change in a case where a failure occurs in the image forming device 43 arranged at the home of the user B and a scanner function has failed is illustrated.

FIG. 10 illustrates an example of the usage status table used in the following description. In the example of the usage status table in FIG. 10, information indicating the usage statuses of home-installed devices of all users of which the image forming device is arranged at home is illustrated.

Figure 11:
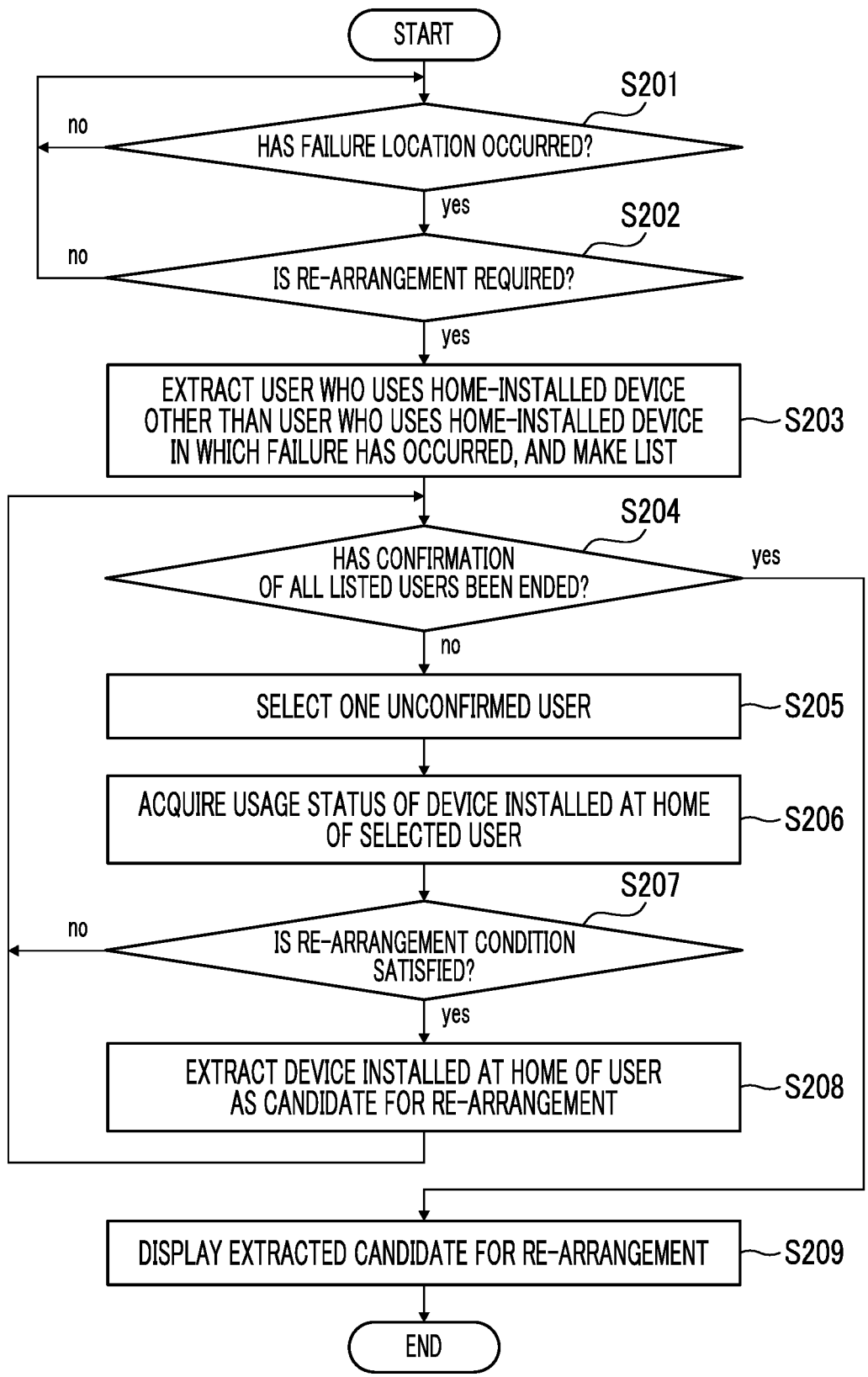
FIG. 11 is a flowchart illustrating the operation of the management server 10 in the exemplary embodiment of the present disclosure in a case where some functions of an image forming device arranged at home of a certain user has failed.
Figure 12:
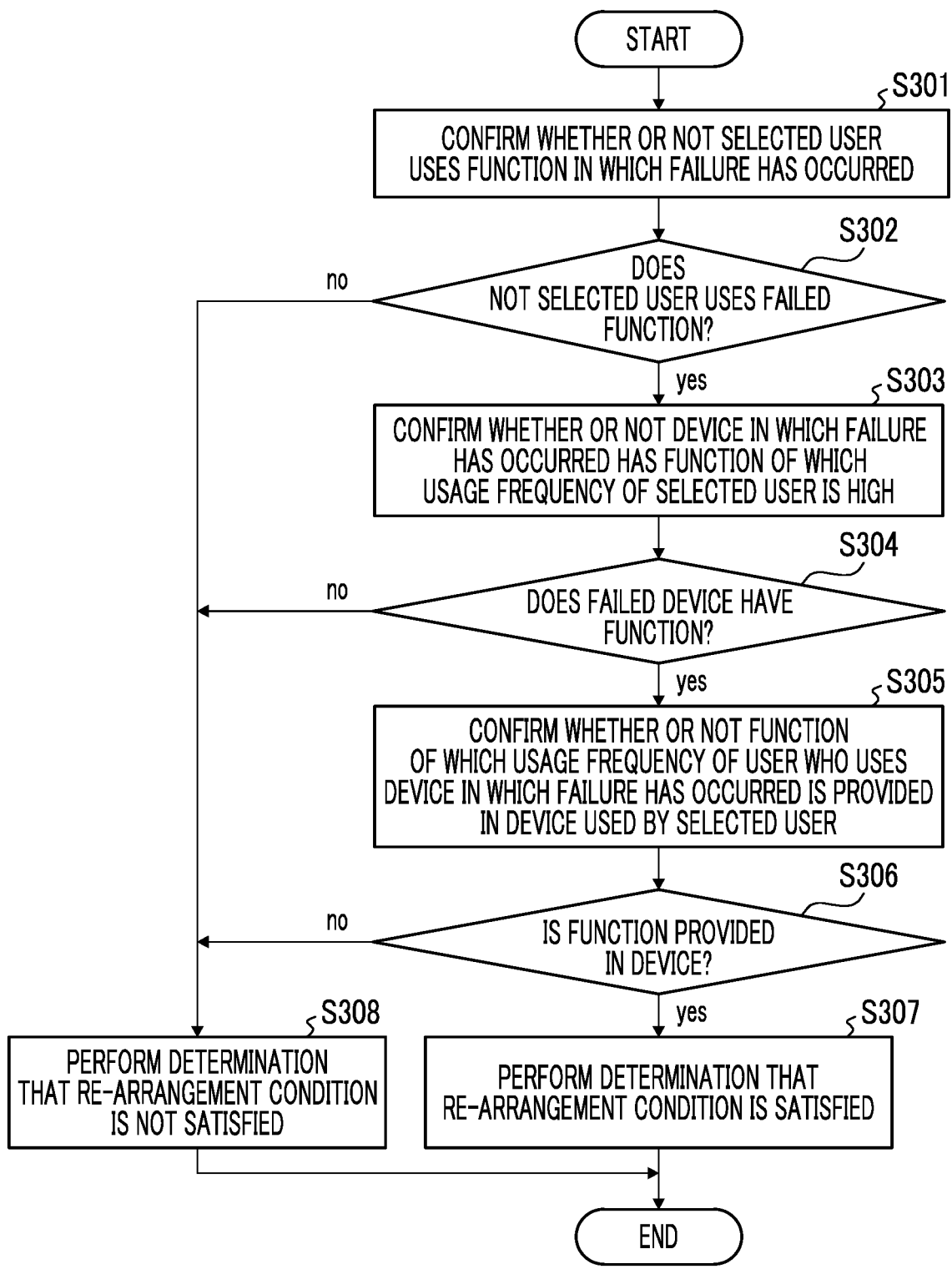
FIG. 12 is a flowchart illustrating a specific determination content of a determination process of whether or not a re-arrangement condition described in Step S207 of the flowchart in FIG. 11 is satisfied.

Next, the operation of the management server 10 in the exemplary embodiment of the present disclosure in a case where some functions of the image forming device arranged at the home of a certain user have failed will be described with reference to the flowcharts in FIGS. 11 and 12.

In Step S201, the control unit 35 determines whether or not a new failure location has occurred, with reference to the user management table. In a case where it is determined in Step S201 that the new failure location has occurred, in Step S202, the control unit 35 determines whether or not re-arrangement of the image forming device is required.

Here, the case where the re-arrangement of the image forming device is required is specifically a case where a specific function of the image forming device arranged at the home of a certain user has failed and a case where the usage frequency of the failed function by the user is higher than the value set in advance. That is, in a case where the printing function of the image forming device arranged at the home of a user of whom the usage frequency of the printing function is high has failed, or in a case where the scanning function of the image forming device arranged at the home of a user of whom the usage frequency of the scanning function is high has failed, it is determined that the re-arrangement is required.

In a case where it is determined in Step S201 that no new failure location has occurred, or in a case where it is determined in Step S202 that the re-arrangement of the image forming device is not required, the control unit 35 repeats the determination in Step S201 until a new failure location occurs.

In a case where it is determined in Step S202 that the re-arrangement of the image forming device is required, in Step S203, the control unit 35 extracts a user who uses the home-installed device among users other than the user who the home-installed device in which failure has occurred, and makes a list of the extracted users. Specifically, the control unit 35 extracts the user who uses the home-installed device among users other than the user B, from the user management table illustrated in FIG. 9, and then creates the list table of the home-installed device using user as illustrated in FIG. 13.

By referring to the list table of the home-installed device using user in FIG. 13, it can be understood that the users A and D are extracted as the users who use the home-installed device.

Then, in Step S204, the control unit 35 determines whether or not the confirmation of all the listed users has been ended. Here, since the confirmation of all the users has not been ended yet, the control unit 35 selects one unconfirmed user in Step S205. Description will be made on the assumption that, for example, the control unit 35 selects the user A from the list table illustrated in FIG. 13.

Then, in Step S206, the control unit 35 acquires the usage status of the image forming device 41, which is a device arranged at the home of the selected user A, from the data storage unit 36. Specifically, the control unit 35 acquires information on the usage status of the user A from the usage status table illustrated in FIG. 10.

In Step S207, the control unit 35 determines whether or not a re-arrangement condition is satisfied. The specific content of the determination as to whether or not the re-arrangement condition is satisfied will be described separately with reference to the flowchart in FIG. 12.

In a case where it is determined in Step S207 that the re-arrangement condition is satisfied, in Step S208, the control unit 35 extracts the image forming device 41 arranged at the home of the user A as the candidate for re-arrangement. Then, the control unit 35 proceeds to the process of Step S204.

In a case where it is determined in Step S207 that the re-arrangement condition is not satisfied, the control unit 35 does not extract the image forming device 41 arranged at the home of the user A as the candidate for re-arrangement, and proceeds to the process of Step S204.

In Step S204, the control unit 35 determines whether or not the confirmation of all the users listed in Step S203 has ended. The control unit 35 repeats the processes of Steps S205 to S208 until the confirmation of all the listed users is ended.

In a case where it is determined that the confirmation of all the users listed in Step S204 has ended, in Step S209, the control unit 35 displays a list of image forming devices extracted as the candidates for re-arrangement.

Next, a specific determination content of a determination process of whether or not the re-arrangement condition is satisfied, which has been described in Step S207 of the flowchart in FIG. 11 will be described with reference to the flowchart in FIG. 12.

In the following description, a case where a failure occurs in the scanner function of the image forming device 43 arranged at the home of the user B and the selected user is the user A will be described.

First, in Step S301, the control unit 35 confirms whether or not the selected user A uses the function in which the failure has occurred, that is, the scanning function. Specifically, the control unit 35 confirms whether or not the usage frequency of the scanner function by the user A is equal to or more than the value set in advance, with reference to the number of times of performing scanning by the user A in the usage status table illustrated in FIG. 10. For example, in a case where the usage status table illustrated in FIG. 10 is a table of the number of times of use per month, the control unit 35 confirms whether or not the usage frequency of the scanner function by the user A is equal to or more than 10 times per month.

Then, in Step S302, the control unit 35 determines whether or not the selected user A uses the function in which the failure has occurred, that is, the scanning function.

In the usage status table illustrated in FIG. 10, the number of times of performing scanning by the user A is 0, and the usage frequency of the scanner function by the user A is not equal to or more than the value set in advance. Thus, the control unit 35 determines that the user A does not use the scanner function.

Then, in Step S303, the control unit 35 confirms whether or not the image forming device 43 in which the failure has occurred has a function of which the usage frequency of the selected user A is high. Specifically, with reference to the usage status table in FIG. 10, the control unit 35 determines that the function of which the usage frequency of the user A is a color-copying function, a black-and-white copying function, and the printing function, and confirms whether or not the above functions are provided in the image forming device 43 in which the failure has occurred.

Then, in Step S304, the control unit 35 determines whether or not the image forming device 43 in which the failure has occurred has a function of which the usage frequency of the user A is high.

Here, since the image forming device 43 is a color multifunction device and has the color-copying function, the black-and-white copying function, and the printing function, the control unit 35 determines that the image forming device 43 in which the failure has occurred has the function of which the usage frequency of the user A is high.

Then, in Step S305, the control unit 35 confirms whether or not the function of which the usage frequency of the user B who uses the image forming device 43 in which the failure has occurred is provided in the image forming device 41 used by the selected user A. Specifically, with reference to the usage status table in FIG. 10, the control unit 35 determines that the function of which the usage frequency of the user A is the black-and-white copy function, the scanning function, and the printing function, and confirms whether or not the above functions are provided in the image forming device 41 used by the user A.

In Step S306, the control unit 35 determines whether or not the image forming device 41 used by the user A has a function of which the usage frequency of the user B is high.

Here, since the image forming device 41 is a color multifunction device and has the black-and-white copy function, the scanning function, and the printing function, the control unit 35 determines that the image forming device 41 has the function of which the usage frequency of the user B is high.

Therefore, in Step S307, the control unit 35 determines that the image forming device 41 used by the selected user A satisfies the re-arrangement condition. In a case where it is determined in Step S302 that the user A uses the scanner function, in a case where it is determined in Step S304 that the image forming device 43 in which the failure has occurred does not have the function of which the usage frequency of the user A is high, or in a case where it is determined in Step S306 that the image forming device 41 used by the user A does not have the function of which the usage frequency of the user B is high, in Step S308, the control unit 35 determines that the image forming device 41 used by the selected user A does not satisfy the re-arrangement condition.

The determination method described above is merely an example, and other determination methods may be used. For example, the control unit 35 extracts the image forming device in which the usage frequency of the failed scanning function is equal to or less than the value set in advance, from a plurality of image forming devices arranged at homes of users other than the user B. In a case where the function having the usage frequency that is higher than the value set in advance in the extracted image forming device is provided in the image forming device 43 of the user B, and the function having the high usage frequency in the failed image forming device 43 is provided in the extracted image forming device, the control unit 35 may propose re-arrangement in which the failed image forming device 43 and the extracted image forming device are replaced with each other.

With the determination process as described above, the control unit 35 proposes, for example, re-arrangement in which the image forming device 41 and the image forming device 43 are replaced with each other, by displaying the re-arrangement on the display unit 33. The administrator user who has received the proposal for the re-arrangement decides to replace the image forming device 41 and the image forming device 43 with each other, and arranges the movement. As a result, as illustrated in FIG. 14, the image forming device 43 having the failed scanner function is arranged at the home of the user A, and the image forming device 41 is arranged at the home of the user B. Here, since the user A has a low frequency of using the scanner function, there is no problem even though the image forming device 43 has the failed scanner function, and there is no problem in work as long as the image forming device 43 has the color-copying function that is frequently used. Then, the user B can use the image forming device 41 in which the scanning function has not failed, by the replacement between the devices, and can perform work using the scanning function.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Modification Examples

In the above exemplary embodiment, the case where the management server 10 proposes the re-arrangement of the image forming device has been described, but the present disclosure is not limited to this. The functions of the management server 10 described above can be incorporated into the image forming device such as a multifunction device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
in a state where a plurality of image forming devices are arranged to be distributed into a first place and a second place, the first place in which a specific user exclusively uses the image forming device, and the second place in which a plurality of users share and use the image forming device, in a case where a usage status of a user changes or any of the plurality of image forming devices arranged changes, propose re-arrangement of the plurality of image forming devices arranged with reference to a usage history of each function by each user in the plurality of image forming devices.

2. The information processing apparatus according to claim 1, wherein the processor is configured to:
in a case where a certain user starts to perform work in the first place, extract the image forming device having a usage frequency that is equal to or less than a value set in advance among the image forming devices used by other users in the first place, and
propose re-arrangement of the extracted image forming device to the first place in which the user who has started to perform the work in the first place performs the work.

3. The information processing apparatus according to claim 2, wherein the processor is configured to:
with reference to a value of the number of output sheets in the first place and a value of the number of output sheets in the second place, for each user, the number of output sheets being a sum of the number of printed sheets and the number of copies, extract the image forming device of the user in which a ratio of the value in the first place to the value in the second place is equal to or less than a ratio set in advance, as the image forming device having the usage frequency that is equal to or less than the value set in advance, and
propose re-arrangement of the extracted image forming device to the first place in which the user who has started to perform the work in the first place performs the work.

4. The information processing apparatus according to claim 1, wherein the processor is configured to:
in a case where a specific function in any image forming device arranged in the first place has failed, and the usage frequency of the failed specific function is higher than a value set in advance, propose re-arrangement in which the failed image forming device and another image forming device are replaced with each other.

5. The information processing apparatus according to claim 4, wherein the processor is configured to:
   extract the image forming device in which the usage frequency of the failed specific function is equal to or less than the value set in advance among the plurality of image forming devices, and
   in a case where the function having the usage frequency that is higher than the value set in advance in the image forming device is provided in the failed image forming device, and the function having the usage frequency that is higher than the value set in advance in the failed image forming device is provided in the extracted image forming device, propose re-arrangement in which the failed image forming device and the extracted image forming device are replaced with each other.

6. A non-transitory computer readable medium storing a program causing a computer to execute a process comprising:
   proposing, in a state where a plurality of image forming devices are arranged to be distributed into a first place and a second place, the first place in which a specific user exclusively uses the image forming device, and the second place in which a plurality of users share and use the image forming device, in a case where a usage status of a user changes or any of the plurality of image forming devices arranged changes, re-arrangement of the plurality of image forming devices arranged with reference to a usage history of each function by each user in the plurality of image forming devices.

7. An information processing method comprising:
   proposing, in a state where a plurality of image forming devices are arranged to be distributed into a first place and a second place, the first place in which a specific user exclusively uses the image forming device, and the second place in which a plurality of users share and use the image forming device, in a case where a usage status of a user changes or any of the plurality of image forming devices arranged changes, re-arrangement of the plurality of image forming devices arranged with reference to a usage history of each function by each user in the plurality of image forming devices.

* * * * *